US009841261B2

(12) United States Patent
Raghavan et al.

(10) Patent No.: US 9,841,261 B2
(45) Date of Patent: Dec. 12, 2017

(54) COMBINATION OVEN WITH PEAK POWER CONTROL

(71) Applicant: Alto-Shaam. Inc., Menomonee Falls, WI (US)

(72) Inventors: J. K. Raghavan, Mequon, WI (US); Steve Maahs, Hartland, WI (US); Andy Tishendorf, Campbell Sport, WI (US); Janus Bartelick, Germantown, WI (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 363 days.

(21) Appl. No.: 14/260,395

(22) Filed: Apr. 24, 2014

(65) Prior Publication Data

US 2014/0319119 A1  Oct. 30, 2014

Related U.S. Application Data

(60) Provisional application No. 61/816,861, filed on Apr. 29, 2013.

(51) Int. Cl.
| | |
|---|---|
| *A21B 3/04* | (2006.01) |
| *A21B 1/08* | (2006.01) |
| *F24C 15/32* | (2006.01) |
| *F42B 33/06* | (2006.01) |
| *H05B 1/02* | (2006.01) |
| *F24C 7/08* | (2006.01) |
| *A47J 27/04* | (2006.01) |
| *F42B 33/00* | (2006.01) |

(52) U.S. Cl.
CPC .............. *F42B 33/06* (2013.01); *A21B 3/04* (2013.01); *A47J 27/04* (2013.01); *F24C 7/085* (2013.01); *F24C 15/327* (2013.01); *F42B 33/001* (2013.01); *H05B 1/0263* (2013.01); *A47J 2027/043* (2013.01)

(58) Field of Classification Search
CPC . A21B 1/08; A21B 3/04; F24C 15/002; F24C 15/32
USPC ......... 219/391, 392, 393, 400, 401; 126/120
See application file for complete search history.

(56) References Cited

U.S. PATENT DOCUMENTS

| | | | | | |
|---|---|---|---|---|---|
| 4,167,585 | A | * | 9/1979 | Caridis | A21B 1/48 426/233 |
| 4,281,636 | A | * | 8/1981 | Vegh | A47J 27/16 126/20 |
| 4,509,412 | A | * | 4/1985 | Whittenburg | A47J 27/04 126/20 |
| 4,623,780 | A | * | 11/1986 | Shelton | A47J 39/003 126/20 |

(Continued)

FOREIGN PATENT DOCUMENTS

EP          2123981 B1 * 11/2010

*Primary Examiner* — Michael Laflame, Jr.
(74) *Attorney, Agent, or Firm* — Boyle Fredrickson, S.C.

(57) ABSTRACT

A commercial oven, such as a combination oven providing steam and convection heating, may provide for two different peak power modes and for steam cooking. A temperature sensor sampling temperature from a region of the oven may be used to detect a complete filling of the oven with steam. The temperature of the temperature sensor is compared against different temperature thresholds depending on the selected peak power so that temperature may be used to discriminate steam filling for different peak power levels.

19 Claims, 5 Drawing Sheets

(56) References Cited

U.S. PATENT DOCUMENTS

| | | | | |
|---|---|---|---|---|
| 4,650,968 A * | 3/1987 | Williams | A47J 27/04 | 126/20 |
| 4,851,644 A * | 7/1989 | Oslin | A47J 27/04 | 219/400 |
| 5,256,382 A * | 10/1993 | Ford | A61L 2/06 | 219/401 |
| 5,272,963 A * | 12/1993 | Del Fabbro | A21B 3/04 | 126/20 |
| 5,402,709 A * | 4/1995 | Carron | A47J 27/16 | 126/20 |
| 5,491,323 A * | 2/1996 | Mori | H05B 6/645 | 219/494 |
| 5,595,109 A * | 1/1997 | Shelton | A47J 27/16 | 126/21 A |
| 5,619,983 A * | 4/1997 | Smith | A47J 27/16 | 126/20 |
| 5,676,044 A * | 10/1997 | Lara, Jr. | A21B 1/245 | 126/21 A |
| 5,723,846 A * | 3/1998 | Koether | F24C 7/087 | 219/483 |
| 6,274,859 B1 * | 8/2001 | Yoshino | H05B 6/6411 | 219/746 |
| 7,946,220 B2 * | 5/2011 | Ose | F24C 15/327 | 219/395 |
| 8,993,934 B2 * | 3/2015 | Giazzon | F24C 15/327 | 219/400 |
| 2004/0261632 A1 * | 12/2004 | Hansen | F24C 15/327 | 99/468 |
| 2006/0081592 A1 * | 4/2006 | Williams | F24C 7/087 | 219/401 |
| 2008/0066661 A1 * | 3/2008 | Berkenkoetter | F24C 7/087 | 110/162 |
| 2008/0134904 A1 * | 6/2008 | Heitmann | F24C 7/08 | 99/342 |
| 2010/0083845 A1 * | 4/2010 | Block | F22B 1/284 | 99/330 |
| 2010/0140251 A1 * | 6/2010 | Shei | A21B 3/00 | 219/430 |
| 2014/0083309 A1 * | 3/2014 | Reese | A47J 39/003 | 99/474 |
| 2014/0291312 A1 * | 10/2014 | Wurdinger | A21B 3/04 | 219/401 |

* cited by examiner

COMBINATION OVEN WITH PEAK POWER CONTROL

CROSS-REFERENCE TO RELATED APPLICATIONS

This application claims priority to U.S. provisional application Ser. No. 61/816,861, filed Apr. 29, 2013, the entire contents of which are incorporated herein by reference.

BACKGROUND OF THE INVENTION

The present invention relates to ovens for preparing food and in particular to a "combination" oven that may cook food with steam and convection airflow and that further provides for the adjustment of peak oven heating power.

High-end commercial ovens may provide for multiple cooking modes including heat augmented with forced airflow (convection) and heat augmented with steam. Generally, convection cooking uses a fan to disrupt the insulating effect of stagnant air around the food, increasing the heat flow to the food. This increased peak flow may be used, for example, to promote surface browning of the food. In contrast, the application of steam (typically also with operation of the convection fan) can provide for fast cooking while retaining food moisture, flavors, and nutrients. Steam cooking generally prevents surface browning. These different modes may be combined in sequence during a cooking cycle, for example, to rapidly cook meat and then to brown its surface.

Different heat sources are commonly used for ovens including electrical heating elements, which employ electrical current passing through a resistance in communication with the oven cavity, and gas heating elements, which provide for the combustion of gas and the circulation of the combustion exhaust through a heat exchanger in communication with the oven cavity. Temperature control of the oven is typically provided by switching the electrical current or the gas on and off according to a sensed temperature of the oven cavity. Such switching between on and off states greatly simplifies the control of the electrical current and gas elements.

Ovens of this type are commercially available from the Alto-Shaam Inc. of Menomonee Falls, Wis. and are described generally in U.S. Pat. No. 6,188,045, entitled "Combination Oven with Three Stage Water Atomizer" hereby incorporated by reference.

The speed with which an oven can attain a given temperature when loaded with food is normally determined by the peak power that may be delivered to the heating element when the heating element is continuously operating. Normally, this peak power of the heating element is selected to effect a desired trade-off between energy usage and oven performance.

The need to compromise between energy usage and oven performance can be relaxed by the use of the so-called "turbo" mode in which the peak power of the heating element is adjusted. Turbo mode may be desired when fast cooking speeds are of great importance.

SUMMARY OF THE INVENTION

The present invention provides improved integration of "turbo" mode adjustment of heater peak power into a combination oven providing steam cooking. In this regard, the inventors have determined that changing the peak power of the oven operation can adversely affect the ability to detect the presence of steam filling the oven cavity normally done with a temperature probe. If the filling of the oven cavity with steam is not accurately detected, food may dry or brown undesirably or prematurely in the steam cooking process. By modifying the steam sensing temperature threshold according to peak power setting, accurate control of steam cooking may be obtained and high peak power cooking can work smoothly with steam cooking.

In one embodiment, the present invention provides a combination oven having an insulated housing including a door closing to define an interior cooking cavity and an opening to provide access to the cooking cavity. A cooking cavity heater communicates with the cooking cavity to heat the cooking cavity, the cooking cavity heater providing at least two power settings according to a power signal. A steam generator produces steam within the cooking cavity according to a steam production signal. A first temperature sensor samples a temperature of the cooking cavity to provide a temperature signal and a second temperature sensor located near an outlet from the interior cooking cavity produces a second temperature signal. A controller communicates with the cooking cavity heater, steam generator and first and second temperature sensors, and executes a program stored in memory to (i) generate a steam detection signal as a function of the second temperature signal and the power signal and indicating the presence of steam filling the cooking cavity; and (ii) control at least one of the steam production signal and power signal according to a stored program according to the temperature signal and the steam detection signal.

It is thus a feature of at least one embodiment to accurately detect the presence of steam in the cooking cavity regardless of the power level of the heating elements.

The second temperature sensor may be at a bottom end of the cooking cavity.

It is thus a feature of at least one embodiment to detect when steam fills the entire oven cavity by situating the sensor away from the upper area where steam will naturally congregate.

A water trap may define a volume for holding water and providing a drain pipe communicating between the cooking cavity and the volume, wherein the second temperature sensor is located within the volume. Excess pressure or steam from the cooking cavity may escape through the drain pipe into the volume and exit through the outlet.

It is thus a feature of at least one embodiment to locate the steam sensor in an environment that will experience a significant temperature change for both high and low power levels. Trapped water which cools the steam and prevents excess heat from passing out of the oven cavity also cools the probe when steam is not present. Gases also pass the second temperature sensor to provide a continuous sampling of air steam.

The steam detection signal may be generated by comparing the second temperature signal against a threshold temperature linked to the power signal according to a stored program. The threshold temperature may be a higher temperature when at a higher power level compared to a lower power level.

It is thus a feature of at least one embodiment to provide a simple function for detecting steam from air temperature for different power levels. The threshold temperature is adjusted to deal with changes that occur when cooking at a "turbo" mode.

The at least two power signals may include at least two ON power signals which heat the cooking cavity at different heating levels.

It is thus a feature of at least one embodiment to provide a combination oven that cooks at at least two power output modes, such as normal and "turbo" modes.

The steam generator may be a boiler element having a volume for holding water and a boiler heating element. The steam generator may be a water nozzle directing water into a heating element.

It is thus a feature of at least one embodiment to provide a system that works with a variety of steam generation techniques.

A steam bypass conduit may communicate between the cooking cavity and the volume. Excess pressure or steam from the cooking cavity may escape through the steam bypass conduit into the volume and exit through the outlet.

It is thus a feature of at least one embodiment to provide a constant sampling of oven atmosphere for the detection of steam.

The first temperature sensor may be located within the interior cooking volume.

It is thus a feature of at least one embodiment to provide a separate temperature probe for detecting the cooking cavity temperature for determining on-off function of the heating element.

An alternative embodiment of the present invention provides a combination oven having an insulated housing including a door closing to define an interior cooking cavity and an opening to provide access to the cooking cavity. A cooking cavity heater communicates with the cooking cavity to heat the cooking cavity, the cooking cavity heater providing at least two power settings according to a power signal. A steam generator produces steam within the cooking cavity according to a steam production signal. A first temperature sensor samples a temperature of the cooking cavity to provide a temperature signal and a second temperature sensor located near an outlet from the interior cooking cavity produces a second temperature signal. A controller communicates with the cooking cavity heater, steam generator and first and second temperature sensors, and executes a program stored in memory to (i) generate a steam detection signal as a function of the second temperature signal and the power signal and indicating the presence of steam filling the cooking cavity when the second temperature signal is above a temperature threshold linked to the power signal; and (ii) control at least one of the steam production signal and power signal according to a stored program according to the temperature signal and the steam detection signal.

A first power setting is higher than a second power setting, and a temperature threshold correlating to the first power setting is higher than a temperature threshold correlating to the second power setting.

It is thus a feature of at least one embodiment to provide more than one cooking power modes and more than one temperature thresholds correlating to the power modes.

A first lower temperature threshold is used during steam generation and a second higher temperature threshold is used during cooking.

It is thus a feature of at least one embodiment to correct for the detection of the exhaustion of steam being delayed.

Still another embodiment of the present invention provides a method for operating a combination oven having the steps of providing a combination oven, as described herein, and inputting a user command into a control panel for setting the power signal.

These particular objects and advantages may apply to only some embodiments falling within the claims and thus do not define the scope of the invention.

DETAILED DESCRIPTION OF THE PREFERRED EMBODIMENT

Figure 1:
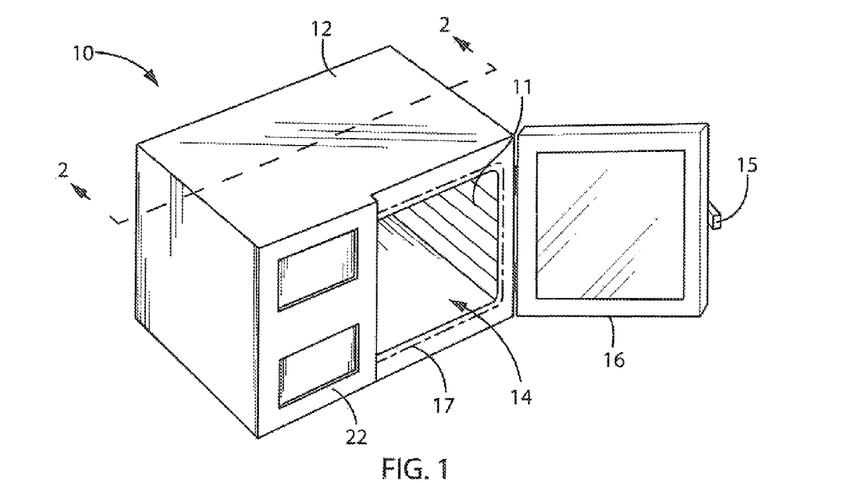
FIG. 1 is a simplified perspective view of a combination oven suitable for use with the present invention showing a housing having an openable door to reveal a cooking volume and showing a user interface on a front surface of the oven.

Referring now to FIG. 1, a turbo-mode combination oven 10 according to one embodiment of the present invention may provide a housing 12 defining an oven cavity 14 with sidewalls of the oven cavity 14 providing for rack supports 11 holding conventional cooking racks for supporting pans or trays of food.

The oven cavity 14 may be accessed through a door 16 connected by a hinge at one vertical side of the oven cavity 14. The door 16 may close over the oven cavity 14 during the cooking operation as held by a latch assembly 15 (visible on the door 16 only). In the closed position, the door 16 may substantially seal against the oven cavity 14 by compressing a gasket 17 surrounding an opening of the oven cavity 14 in the housing 12.

At one side of the oven cavity 14, the housing 12 may support a control panel 22 accessible by a user standing at a front of the oven 10. The control panel 22 may provide conventional electronic controls such as switches, buttons, a touchscreen or the like that may receive oven control data from the user as will be described below.

Figure 2:
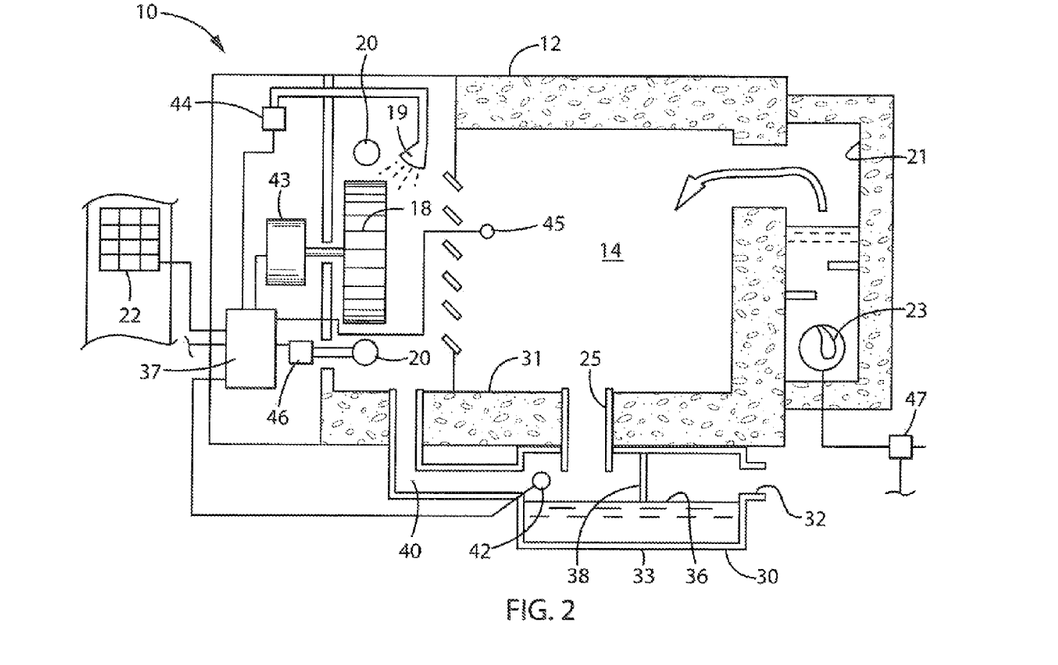
FIG. 2 is a section along line 2-2 of FIG. 1 showing internal components of the combination oven including a convection fan, heater unit, and condenser unit of the oven, the latter including a steam sensor temperature gauge.

Referring now also to FIG. 2, a motor-driven convection fan 18 may be positioned within the housing 12 to direct a stream of air across a heater element 20 into the oven cavity 14. The heater element 20 may be an electric heating element or a heat exchanger receiving heat from a gas flame or the like and may surround the convection fan 18.

Steam may be introduced into the oven cavity 14, for example, by a valve-controlled water nozzle 19 directing a spray of water on the fan 18 and the heater element 20 proximate to the fan 18. Alternatively, steam may be provided by a separate boiler 21 having a dedicated heater element 23 and communicating with the oven cavity 14.

Ovens of this type are commercially available from the Alto-Shaam Inc. of Menomonee Falls, Wis. and are described generally in U.S. Pat. No. 6,188,045, entitled "Combination Oven with Three Stage Water Atomizer" hereby incorporated by reference.

Referring still to FIG. 2, a bottom wall 31 of the oven cavity 14 may expose a channel to a drainpipe 25 extending downwardly from the bottom wall 31 to a condenser chamber 30 positioned beneath the bottom wall 31. The drainpipe 25 may extend vertically (as shown) or may extend horizontally for a short distance before or after it is received within the condenser chamber 30. In either case, the drainpipe 25 allows steam and water vapor to enter the condenser chamber 30 which provides a generally enclosed box whose upstanding sidewalls retain a pool of water having a water level 36. The lower end of the drainpipe 25 passing into the condenser chamber 30 stops above the bottom wall 33 and above a water level 36.

An opposite end of the condenser chamber 30 provides an exit port 32 leading to the outside atmosphere. A baffle plate 38 extends downward from an upper surface of the chamber 30 below the water level 36 to separate the drainpipe 25 from the exit port 32 except by a path passing through the contained water. Excess pressure from cooking or from steam may escape through the drainpipe 25 bubbling through the water under the baffle plate 38 to the exit port 32. This process cools the steam and prevents excess heat from passing out of the oven cavity 14 as might occur if there were a direct path to the outer atmosphere.

A variation on this design of the condenser chamber 30 is shown in U.S. patent application Ser. No. 13/306,687 filed Nov. 29, 2011, entitled "Grease Handling Apparatus for Closed-system Oven" assigned to the same assignee as the present invention and hereby incorporated by reference.

Referring still to FIG. 2, a steam bypass conduit 40 may also lead from within the oven cavity 14 to condenser chamber 30 to a temperature sensor 42, for example, positioned on the same side of the baffle plate 38 as the drainpipe 25. The steam bypass conduit 40 and the drainpipe 25 may be situated at slightly different regions of pressure within the oven cavity 14 when the fan 18 is operated, so that the gases near the bottom of the oven cavity 14 flow past the temperature sensor 42 to provide a continuous sampling of air or steam from near the bottom of the oven cavity 14.

An internal controller 37 may be positioned within an equipment cavity adjacent to the oven cavity 14 but maintained at a cooler temperature. The controller 37 provides a computer processor providing a processor and associated memory, for example, flash memory, for executing a program held in the associated memory. Execution of the program may generate control signals output by interface circuitry of the controller 37 to components of the oven 10 and may read sensed signals from the user and various sensors within the oven 10. For example, the controller 37 may receive signals from temperature sensor 42 in the condenser chamber 30, one or more internal oven temperature sensors 45 in the oven cavity 14, each providing temperature signals (X1), as well as signals from the control panel 22 providing user commands. The controller 37 may output convection control signals to a motor 43 operating the fan 18 (to control a convection mode of the oven 10). In addition, the controller 37 may output steam control signals to a valve 44 communicating between a water supply and the nozzle 19 to generate steam, or alternatively to electrically controlled switch 47 communicating between line power and the heater element 23 to generate steam. In addition the controller 37 may provide a heat power signal to a heater controller 46 controlling heating elements 20 according to four states of peak power output including: off, a first peak power level, and a second peak power level greater than the first peak power level and a third power level greater than the second power level. Typically, the third peak power level will be at least 10% larger than the second peak power level, for example, boosting the peak power of the heating elements from 10 kilowatts to 14 kilowatts.

Figure 3:
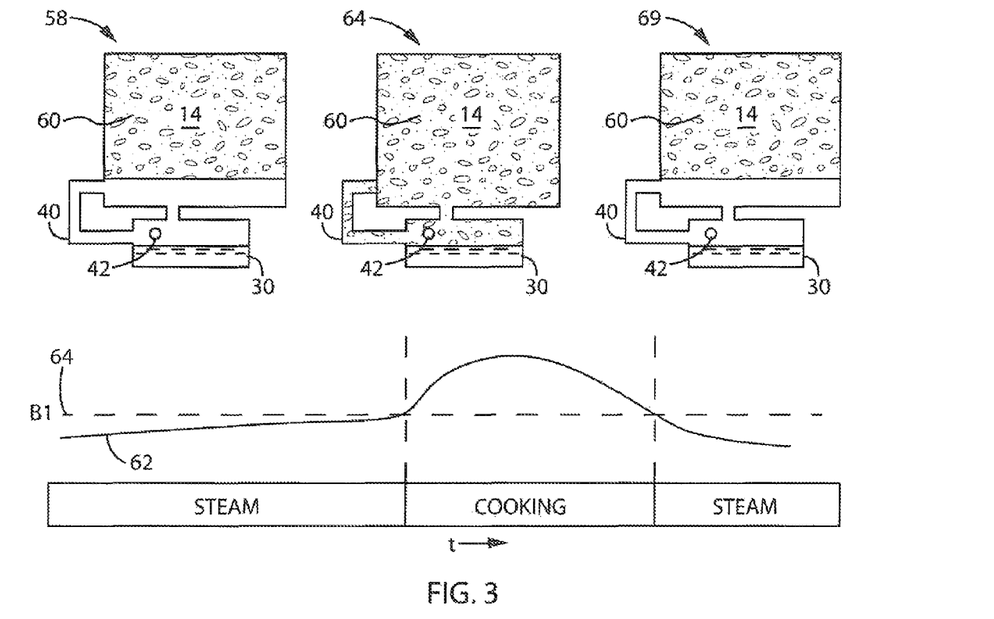
FIG. 3 is a plot of steam sensor temperature together with cooking mode versus time for a non-turbo operation of the oven depicting three stages of steam generation: filling, cooking, and recharging as may be detected by comparing steam temperature against a first threshold.
Figure 5:
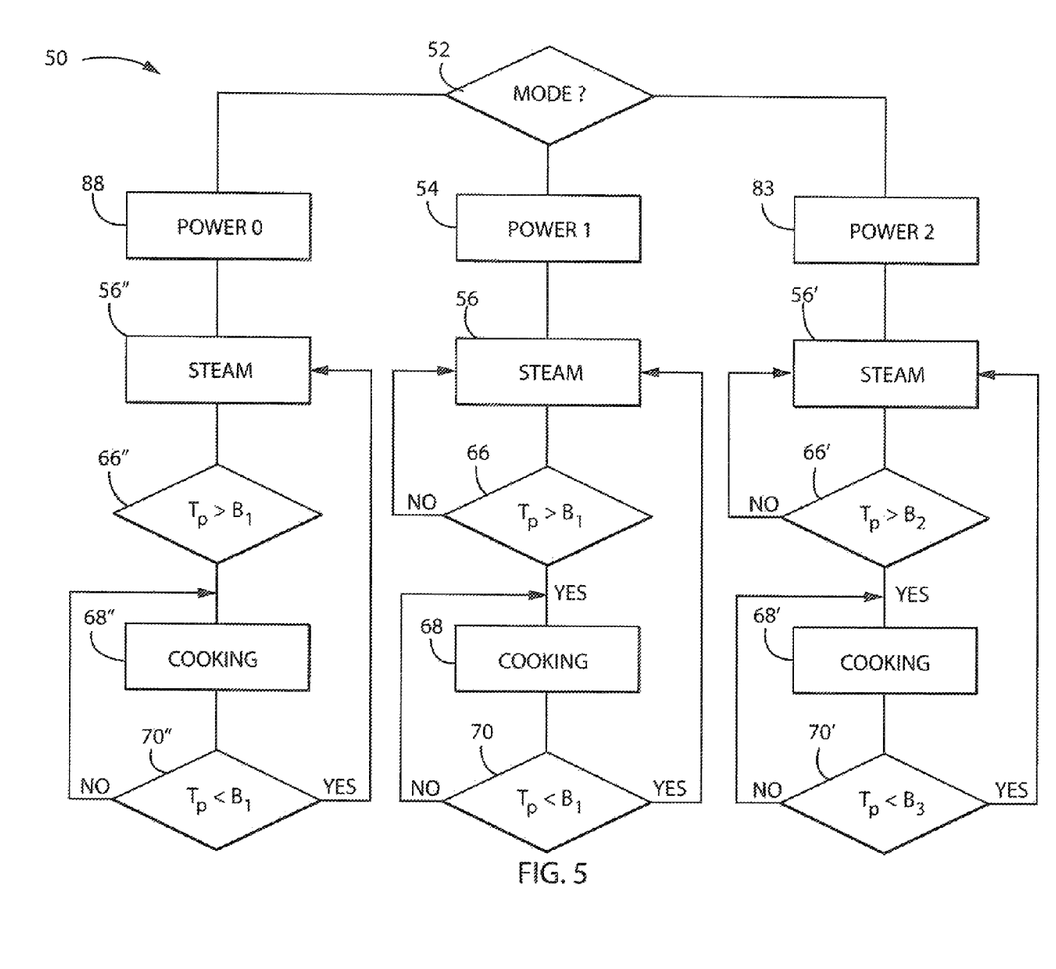
FIG. 5 is a flowchart showing operation of the oven of FIG. 1 providing three different power modes for cooking profiles that use both steam and convection operation.

Referring now to FIGS. 2, 3 and 5, the program 50 executing on the controller 37 may receive a mode input command from a user, for example, as entered through control panel 22 and as represented by decision block 52. This mode input will generally indicate a desired peak operating power either directly or as linked to the identification of a predetermined "recipe" by the user, the recipe also providing a schedule of cooking temperatures and cooking modes (convection, steam) in turn associated, for example, with an identified type of food preparation. When the operating power is designated directly, the user may also input other operating parameters such as the cooking mode and temperature directly.

Upon completion of that peak power mode entry, the program 50 moves to a process block that sets the peak operating power of the oven 10, the mechanics of which will be discussed below and as may vary depending on the source of heating energy. As shown generally in FIG. 5, "Power 0" of process block 88 will generally be a low-power, "Power 1" of process block 54 will be a normal power and "Power 2" process block 83 will be a high or turbo power.

For example, the user may select a standard operating mode "Power 1" in which the peak power is set at process block 54 to a standard power level for example of approximately 10 kilowatts. The cooking cycle than proceeds to a steam generation stage indicated by process block 56 where steam is generated either by activation of the boiler 21 (and dispersed by the fan 18 with additional heat added by the heater element 20) or activation of the nozzle 19 to direct water against a heater element 20 under the guidance of the fan 18.

During steam generation stage of process block 56, the temperature (X1) in the oven cavity 14 is moderated to prevent a high temperature cooking of the food until the oven cavity 14 is filled with steam.

This moderation is a simple matter if the oven cavity temperature intended for cooking is below the steam point of 212 degrees Fahrenheit, and simply requires that the oven cavity temperature probe 45 be monitored to moderate the temperature of the oven cavity by switching the heater elements 20 on and off.

On the other hand, if the oven cavity temperature intended for cooking is above 212 degrees Fahrenheit, the oven temperature must be moderated until the oven has filled with steam. If steam is being generated by the nozzle 19, the nozzle is activated during this period so that the formation of steam limits the temperature to approximately 212 degrees. If the boiler 21 is being used for steam production, the temperature is moderated by overriding the setpoint temperature of the oven (preventing the use of the highest power level as will be described) and relying on the stabilizing effects of the introduced steam during this steam generation time.

As shown diagrammatically in FIG. 3, during this filling stage 58 steam 60 may partially fill the oven cavity 14 concentrating in its upper portion because of its relative temperature and/or shielding by food on the racks (not shown) and thus the high temperature of the steam 60 is removed from the condenser chamber 30 and thus from temperature sensor 42. A low temperature on temperature sensor 42, then generally indicates that the oven cavity has not fully filled with steam. Specifically, during the initial stages of steam generation, a temperature signal 62 from the temperature sensor 42 (as monitored by decision block 66) will remain below an empirically determined steam overflow temperature 64 (B1), although generally rising over time slightly with increased heating of the oven cavity 14. As will be discussed further below, the steam overflow temperature 64 is linked to the peak power of process block 54.

When steam 60 completely fills the oven cavity 14, it is drawn into the condenser chamber 30 to contact the temperature sensor 42 and the temperature signal 62 rises above the steam overflow temperature 64 of B1. This rise is relatively rapid in part because of the high specific heat of the steam 60, and is detected at decision block 66. For as long as the temperature signal 62 is below the steam overflow temperature 64, the program 50 loops from decision block 66 back to the steam process block 56, however when the temperature signal 62 rises above the steam overflow temperature 64, the program proceeds to a cooking stage indicated by process block 68.

Figure 6:
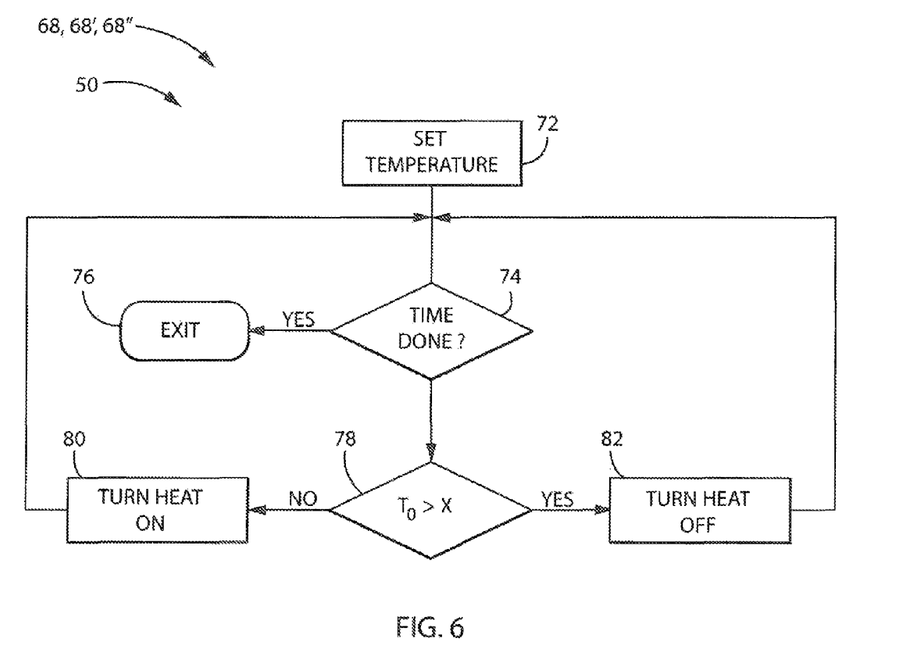
FIG. 6 is a detailed flowchart of the control of the oven during the convection operation.

Referring to FIG. 6, the cooking stage of process block 68 resets the set point temperature of the oven 10 from any lower temperature (X1) used during steam formation temperature to a desired cooking temperature (X2) as indicated by process block 72 and sets a timer for the desired cooking time based on the user's input entered either directly or indirectly through recipe designation. Periodically, the timer is checked to see if the time value has expired as indicated by decision block 74. If the timer has expired, then the program passes to an exit block 76 terminating the cooking process. If the timer has not expired, however, the program 50 proceeds to decision block 70 and the temperature of the oven cavity 14 is compared against the cooking temperature (X2) set at process block 72. If the temperature of the oven cavity 14 as determined from temperature sensor 45 is above the cooking temperature X2, then the heating elements 20 are turned on as indicated by process block 80 to provide the selected peak power. On the other hand, if the temperature of the oven cavity 14 is below the cooking temperature X2, the heating elements 20 are turned off as indicated by process block 82. A dead band providing a few degrees of temperature hysteresis may be implemented to prevent rapid on-off switching of the heater element 20. This dead band, for example, may provide for two slightly displaced thresholds, a higher one used when the heater element 20 is on to determine when the heater element 20 should be switched off and a lower one used when the heater element 20 is off to determine when the heating element should be switched on. This temperature control is thus provided by a simple on and off switching of the heater element 20 whose peak power is independently controlled by the mode setting of process block 54.

Referring in particular to FIG. 3, as the cooking stage of process block 68 continues, steam 60 may be lost or absorbed by the food product raising the risk of undesired food burning or browning. This loss of steam 60 withdraws steam 60 from temperature sensor 42 causing temperature signal 62 to fall. This fall in temperature is detected by decision block 70 triggering the program 50 to return to the steam mode of process block 56 so that more steam 60 is generated in a refilling mode 69 as shown diagrammatically in FIG. 3. Typically, return to the steam mode of process block 56 does not reset the oven cavity temperature to its moderated value of X1 because steam 60 can be replenished rapidly enough to prevent significant change in the cooking environment with respect to drying or browning.

While FIG. 3 depicts a relatively sharp stratification of the steam 60, it will be appreciated that this represents a simplified interpretation of the mechanism for rapid temperature rise at temperature signal 62 which may also in part reflect a relative average change in the humidity within the oven cavity 14 as sampled by the condenser chamber 30, transport delays of the steam into the condenser chamber 30 and other mechanisms and the invention should not be limited by this interpretation of the underlying mechanism.

Figure 4:
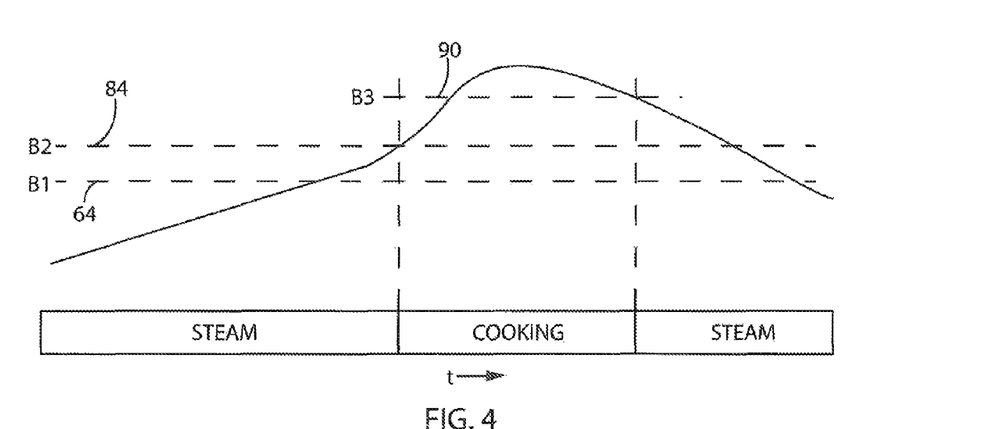
FIG. 4 is a plot similar to that of FIG. 3 of steam sensor temperature and cooking mode versus time for turbo operation of the oven showing the adjustment of temperature detection thresholds to provide proper switching between cooking modes.

Referring now to FIGS. 3, 4 and 5, in an alternative mode of operation, the user may select a turbo mode of operation at decision block 52 causing the program 50 to proceed to process block 83 where the peak power available to the heater elements 20 is increased to a power level greater than that provided at process block 54. The mechanism for increasing this power level will be described later.

After adjusting the peak power level, the program 50 proceeds to a steam generation stage of process block 56' substantially identical to that described with respect to process block 56 with the following exception. If the cooking temperature X2 is above 212 degrees Fahrenheit and steam is being generated by the boiler 21, the peak power level is set back to the standard level for the steam generation process only. Otherwise the higher setting of peak power is used when steam is generated using the nozzle 19.

The filling of the oven cavity 14 with steam 60 is assessed periodically at decision block 66' which evaluates the temperature signal 62' (shown in FIG. 4) of the temperature sensor 42 to determine whether the oven cavity 14 is filled with steam. During the steam generation process, the turbo mode operation with its higher power output may result in a faster rise in temperature signal 62' exceeding steam overflow temperature 64 even before the oven cavity 14 is filled with steam 60. Accordingly, the inventors have determined that a higher temperature threshold 84 (B2) must be adopted at decision block 66'. It will be appreciated from FIG. 4 that without a change in this threshold, the cooking stage of process block 68 would occur early, at time 86, possibly causing undesired cooking of food positioned near the bottom of the oven cavity 14.

At the conclusion of the steam cycle of process block 56', the program again switches to the cooking cycle of process block 68' substantially identical to process block 68 and cooking temperature is boosted for cooking. If the peak power was reset in the steam generation of process block 56, it is returned to its boosted state. The turbo mode of higher peak heating power results in a rapid rise in the temperature signal 62' beyond that which was experienced in the non-turbo mode of process block 54 and as is desired for rapid cooking.

Upon the exhaustion of steam during cooking, the temperature signal 62' begins to fall, however, it has been determined that if the temperature threshold 84 is used, detection of the exhaustion of steam 60 will be erroneously delayed. Accordingly, a third temperature threshold 90 above temperature threshold 84 (designated B3) is established for use at decision block 70' (corresponding approximately to previously described decision block 70) to determine when the steam mode should be reinitialized at process block 56. In this way the implicit tuning that controls the detection of steam 60 through a temperature sensor 42 in the chamber 30 may be for non-turbo mode may also accommodate the significant peak power increase of turbo mode.

This selection of the temperature thresholds 84 and 90 is triggered by the higher power level selected at process block 83

Referring again to FIG. 5, the oven 10 may also provide a reduced power mode may also be provided by the controller as indicated by process block 88. In this reduced power mode the heating elements 20 may be constrained to operate at a reduced peak power level lower than the power levels set at process blocks 54 and 84. In this reduced power mode, steam is generated as indicated by process block 56", a steam fill is detected at decision block 66", cooking is controlled at process block 68" and steam refreshing is controlled at process block 70" corresponding to the similarly numbered process blocks used for standard cooking of 56, 66, 68, and 70. In this regard, the temperature threshold 64 is used for the detection of steam before and after the cooking stage, similar to process block 54.

In operation, a mode input command is entered by the user, for example through a control panel 22, for indicating a peak operating power. The peak operating power may correlate to the normal 54, turbo 83, or reduced 88 power modes described above and indicated by process blocks 54, 83, and 88, respectively. Alternatively, the user may input a "recipe" which is linked to a schedule of cooking temperatures and cooking modes.

The controller 37 receives the mode input command or "recipe" from the user correlating to a desired peak operating power and the oven cavity 14 proceeds to fill with steam, e.g., by nozzle 19 or boiler 21 described above, and shown by process blocks 56, 56', 56". The controller 37 then monitors a temperature signal from temperature sensor 42 indicating the temperature at a lower end of the cavity 14. The controller 37 executes the stored program 50 to generate a steam detection signal indicating that the oven cavity 14 is fully filled with steam as a function of (1) the temperature signal from temperature sensor 42 and (2) the mode input command. A predetermined threshold temperature is linked as a function of the particular mode input command. The temperature signal from temperature sensor 42 is compared to the threshold temperature. A temperature signal from temperature sensor 42 that is higher than the threshold temperature indicates the presence of steam sufficiently filling the cavity and a steam detection signal is generated.

The threshold temperature will be higher for mode input command set at the "turbo" power mode 83, and the threshold temperature will be lower for mode input commands set at the normal 54 power mode (or reduced 88 power mode), as the faster rise in temperature during "turbo" mode 83 may result in an inaccurate steam indication and must be adjusted accordingly.

The steam detection signal indicating that sufficient steam is present in the oven cavity 14 allows the controller 37 to proceed to the cooking process, shown by process blocks 68, 68', 68", and sends a power signal to heating elements 20 to begin cooking. The controller 37 will periodically receive a temperature signal from temperature sensor 45 within the oven cavity 14 to indicate whether heating elements 20 should be turned on or off to provide the desired peak operating power, as shown by program 50 in FIG. 6.

As the cooking process continues and steam within the oven cavity 14 is lost, the temperature sensor 42 will indicate a declining temperature signal so that steam must be regenerated. The loss of steam is again indicated as a function of (1) the temperature signal from temperature sensor 42 and (2) the mode input command, as provided by program 50 executed by controller 37. When the temperature signal falls below a predetermined threshold temperature, the steam generation stage is reentered.

The threshold temperature may be the same or different as the threshold temperature provided during the steam generation stage. For example, in "turbo" mode, the threshold temperature (designated B3) during the cooking stage may be higher than the threshold temperature (designated B2) during the steam generation stage in order to correct for the erroneous delay of the exhaustion of steam.

Figure 7:
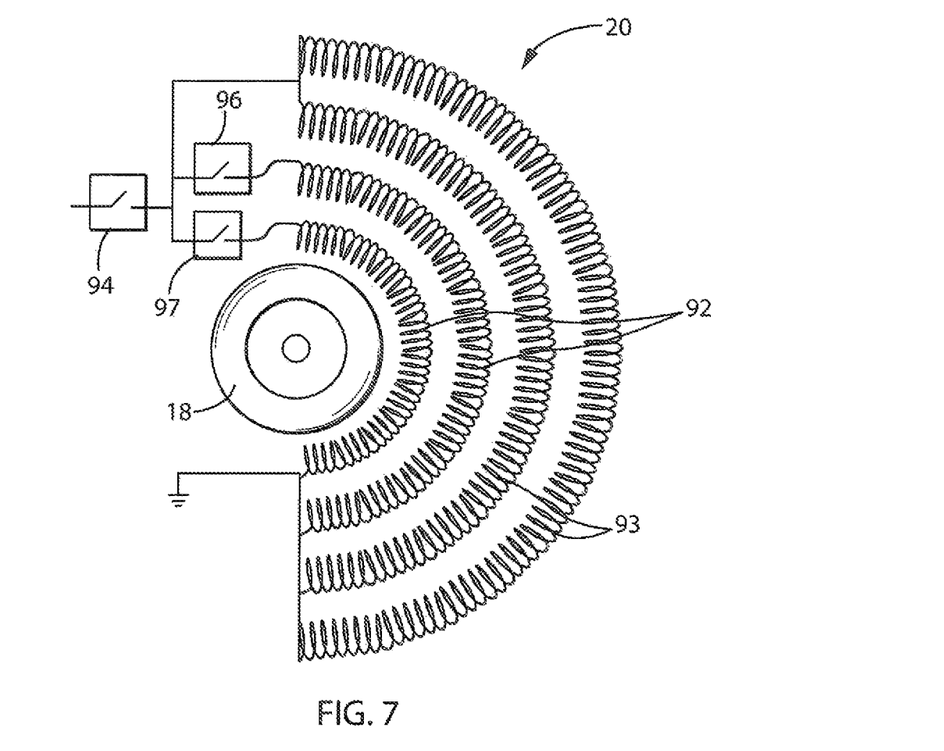
FIG. 7 is a simplified diagram of an electrical heating element showing a switch system providing for the control of two levels of peak power through different heating elements which may be jointly switched for temperature control.

If it is indicated that steam has been lost below an acceptable level, the steam generation stage, shown by process blocks 68, 68', 68", is repeated until (1) the temperature signal from temperature sensor 42 and (2) the mode input command indicate the presence of sufficient steam filling the cavity, as provided by program 50 executed by controller 37, as previously described above. Referring now to FIG. 7, when the heater element 20 is an electrical heating element, the ability to set different peak heating powers at process blocks 54, 84, and 88 may be implemented by selectively connecting either or both of two switchable resistive elements 92 in parallel with a base heating element 93 (being a parallel connected pair of elements) for heating of the oven cavity 14. All resistive heating elements 92 and 93 may be switched in tandem by means of an electrically controllable switch 94 opened and closed by the program operations of process blocks 80 and 82. A first switch 96 in series with only one of the resistive elements 92 and a second switch 97 in series with the other of the resistive elements may be controlled by the power setting process blocks 54, 84, and 88 switching from a low power level of process block 88 by opening both of switches 96 and 97, to a standard power level of process block 54 by closing switch 96 and keeping switch 97 open, and switching to the high-power level of process block 83 by closing both switches 97 and 96 and a high power level of process block 83 by closing switch 96. Each of these switches 94, 96 and 97 may be directly controlled by the controller 37.

Figure 8:
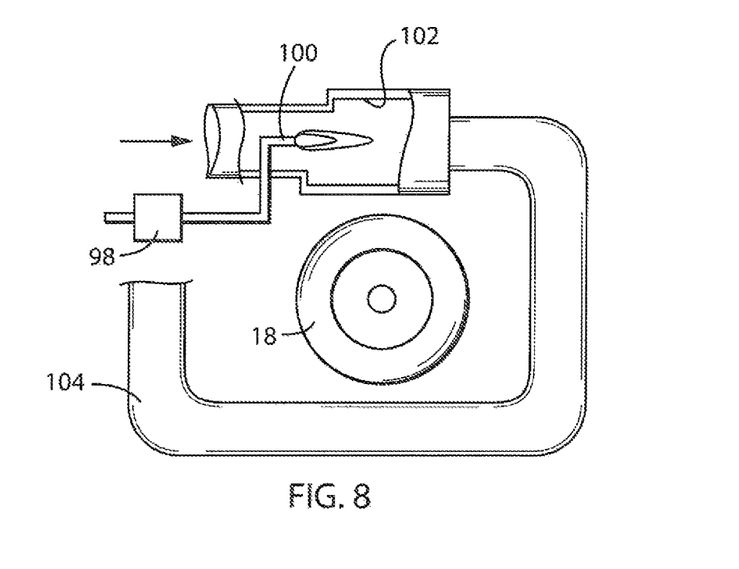
FIG. 8 is a simplified diagram of a gas heating element showing a valve system that may provide for two nonzero levels of gas flow to provide for two levels of peak power.

Referring now to FIG. 8, when the heater element 20 is a gas heating element, a four state valve 98 may deliver three nonzero flow levels of gas to a gas jet 100 with a lowest gas flow used for power setting of process block 88 and a highest gas flow used for turbo mode of process block 83. The valve 98 may also shut the gas off completely so as to provide for temperature control of process blocks 80 and 82. The gas jet 100 releases the gas flow into a combustion chamber 102 where the gas is burned. The exhaust is then released into exhaust pipe 104 which directs the exhaust away from the heater element 20.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a control board" and "a processor" can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A combination oven comprising:
    an insulated housing including a door configured to close to define an interior cooking cavity and an opening to provide access to the cooking cavity;
    a cooking cavity heater communicating with the cooking cavity to heat the cooking cavity, the cooking cavity heater providing a first power setting indicating that the cooking cavity heater is operating at a first peak power, a second power setting indicating that the cooking cavity heater is operating at a second peak power greater than the first peak power, and a third power setting indicating that the cooking cavity heater is off;
    a steam generator for producing steam within the cooking cavity according to a steam production. signal;
    a first temperature sensor for sampling a temperature of the cooking cavity to provide a temperature signal;
    a second temperature sensor located near an outlet from the interior cooking cavity and producing a second temperature signal; and
    a controller communicating with the cooking cavity heater, steam generator and first and second temperature sensors, and executing a program stored in memory to:
    (i) when the cooking cavity heater is operating at the first power setting generate a steam detection signal as a first function of the second temperature signal and when the cooking cavity is operating at the second power setting generate the steam detection signal as a second function of the second temperature signal different from the first function, the steam detection signal indicating the presence of steam filling the cooking cavity;
    (ii) control the cooking cavity heater according to the temperature signal; and
    (iii) control the steam generator according to the second temperature signal and power setting of the oven.

2. The combination oven of claim 1 wherein the second temperature sensor is at a bottom end of the cooking cavity.

3. The combination oven of claim 1 further comprising a water trap defining a volume for holding water and providing a drain pipe communicating between the cooking cavity and the volume, wherein the second temperature sensor is located within the volume.

4. The combination oven of claim 3 wherein excess pressure or steam from the cooking cavity escapes through the drain pipe into the volume and exits through. a volume outlet.

5. The combination oven of claim 1 wherein the steam detection signal is generated by comparing the second temperature signal against a threshold temperature linked to the power setting according to the stored program.

6. The combination oven of claim 5 wherein the threshold temperature according to the stored program is a higher temperature when at a higher power level compared to a lower power level.

7. The combination oven of claim 1 wherein the steam generator is a boiler element having a volume for holding water and a boiler heating element heating the water in the volume.

8. The combination oven of claim 1 wherein the steam generator is a water nozzle directing water into a heating element.

9. The combination oven of claim 3 further comprising a steam bypass conduit communicating between the cooking cavity and the volume.

10. The combination oven of claim 9 wherein excess pressure or steam from the cooking cavity escapes through the steam bypass conduit into the volume and exits through a volume outlet.

11. The combination oven of claim 1 wherein the first temperature sensor is located within the interior cooking volume.

12. A combination oven system comprising:
    an insulated housing including a door configured to close to define an interior cooking cavity and an opening to provide access to the cooking cavity;
    a cooking cavity heater communicating with the cooking cavity to heat the cooking cavity, the cooking cavity heater providing a first power setting indicating that the cooking cavity heater is operating at a first peak power, a second power setting indicating that the cooking cavity heater is operating at a second peak power greater than the first peak power, and a third power setting indicating that the cooking cavity heater is off;
    a steam generator for producing steam within the cooking cavity according to a steam production signal;
    a first temperature sensor for sampling a temperature of the cooking cavity to provide a temperature signal;
    a second temperature sensor located near an outlet from the interior cooking cavity and producing a second temperature signal; and
    a controller communicating with the cooking cavity heater, steam generator and first and second temperature sensors, and executing a program stored in memory to:
    (i) when the cooking cavity heater is operating at the first power setting generate a steam detection signal as a first function of the second temperature signal and when the cooking cavity is operating at the second power setting generate the steam detection signal as a second function of the second temperature signal different from the first function, the steam detection signal indicating the presence of steam filling the cooking cavity;
(ii) control the cooking cavity heater according to the temperature signal; and
(iii) control the steam generator according to the second temperature signal and power setting of the oven.

13. The oven of claim 12 wherein a first power setting is higher than a second power setting, and a temperature threshold correlating to the first power setting is higher than a temperature threshold correlating to the second power setting.

14. The oven of claim 12 wherein a first lower temperature threshold is used during steam generation and a higher second temperature threshold is used during cooking.

15. A method for operating a combination oven comprising the steps of:
providing a combination oven comprising
an insulated housing including a door configured to close to define an interior cooking cavity and an opening to provide access to the cooking cavity;
a cooking cavity heater communicating with the cooking cavity to heat the cooking cavity, the cooking cavity heater providing a first power setting indicating that the cooking cavity heater is operating at a first peak power, a second power setting indicating that the cooking cavity heater is operating at a second peak power greater than the first peak power, and a third power setting indicating that the cooking cavity heater is off;
a steam generator for producing steam within the cooking cavity according to a steam production signal;
a first temperature sensor for sampling a temperature of the cooking cavity to provide a temperature signal;
a second temperature sensor located near an outlet from the interior cooking cavity and producing a second temperature signal; and
a controller communicating with the cooking cavity heater, steam generator and first and second temperature sensors, and executing a program. stored in memory to;
(i) when the cooking cavity heater is operating at the first power setting generate a steam detection signal as a first function of the second temperature signal and when the cooking cavity is operating at the second power setting generate the steam detection signal as a second function of the second temperature signal different from the first function, the steam detection signal indicating the presence of steam filling the cooking cavity;
(ii) control the cooking cavity heater according to the temperature signal; and
(iii) control the steam generator according to the second temperature signal and power setting of the oven.

16. The method of claim 15 wherein the steam detection signal is a function of the second temperature signal compared to a threshold temperature corresponding to the power setting.

17. The method of claim 15 wherein the combination oven further comprises a condenser chamber defining a volume for holding water wherein a drain pipe communicates with the cooking cavity and the volume.

18. The method of claim 17 wherein the steam sensor is in the condenser chamber.

19. The method of claim 15 wherein the combination oven further comprises a steam bypass conduit communicating with the cooking cavity and the volume.

* * * * *